United States Patent
Rostami et al.

(10) Patent No.: US 11,645,544 B2
(45) Date of Patent: May 9, 2023

(54) SYSTEM AND METHOD FOR CONTINUAL LEARNING USING EXPERIENCE REPLAY

(71) Applicant: HRL Laboratories, LLC, Malibu, CA (US)

(72) Inventors: Mohammad Rostami, Los Angeles, CA (US); Soheil Kolouri, Agoura Hills, CA (US); Praveen K. Pilly, West Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 321 days.

(21) Appl. No.: 16/875,852

(22) Filed: May 15, 2020

(65) Prior Publication Data

US 2021/0019632 A1 Jan. 21, 2021

Related U.S. Application Data

(60) Provisional application No. 62/875,178, filed on Jul. 17, 2019.

(51) Int. Cl.
*G06N 3/08* (2006.01)
*G06N 3/04* (2006.01)
*G06N 3/088* (2023.01)

(52) U.S. Cl.
CPC .......... *G06N 3/088* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 2019/0278282 A1* | 9/2019 | Palanisamy | G05D 1/0088 |
| 2020/0125982 A1* | 4/2020 | Gabourie | G06N 7/005 |
| 2021/0249142 A1* | 8/2021 | Lau | G06T 7/11 |

OTHER PUBLICATIONS

Mohammad Rostami et al: "Generative Continual Concept Learning", arxiv.org, Cornell University Library, 201 Olin Library Cornell University Ithaca, NY 14853, Jun. 10, 2019 (Jun. 10, 2019), XP081375101 (Year: 2019).*

Notification of Transmittal and The International Search Report, and the Written Opinion of the International Searching Authority for PCT/US2020/033273; dated Aug. 28, 2020.

(Continued)

*Primary Examiner* — Harry S Hong
(74) *Attorney, Agent, or Firm* — Tope-McKay & Associates

(57) ABSTRACT

Described is a system for continual learning using experience replay. In operation, the system receives a plurality of tasks sequentially, from which a current task is fed to an encoder. The current task has data points associated with the current task. The encoder then maps the data points into an embedding space, which reflects the data points as discriminative features. A decoder then generates pseudo-data points from the discriminative features, which are provided back to the encoder. The discriminative features are updated in the embedding space based on the pseudo-data points. The encoder then learns (updates) a classification of a new task by matching the new task with the discriminative features in the embedding space.

18 Claims, 8 Drawing Sheets

(56) References Cited

OTHER PUBLICATIONS

Mohammad Rostami et al: "Generative Continual Concept Learning", arxiv. org, Cornell University Library, 201 Olin Library Cornell University Ithaca, NY 14853, Jun. 10, 2019 (Jun. 10, 2019), XP081375101, the whole document, Algorithm 1; p. 2-p. 7, figure 1.

Mohammad Rostami et al: "Complementary Learning for Overcoming Catastrophic Forgetting Using Experience Replay", Proceedings of the Twenty-Eighth International Joint Conference on Artificial Intelligence, May 31, 2019 (May 31, 2019), pp. 3339-3345, XP055723042, California.

Timothee Lesort et al: "Continual learning for robotics: Definition, framework, learning strategies, opportunities and challenges", Information Fusion, Jun. 29, 2019 (Jun. 29, 2019), pp. 52-68, XP055723104, Retrieved from the Internet: URL:https:jjarxiv.orgjpdf/1907.00182v1. pdf [retrieved on Aug. 17, 2020] the whole document.

Jaeyoon Yoo et al: "Domain Adaptation Using Adversarial Learning for Autonomous Navigation", arxiv.org, Cornell Un Iversity Library, 201 Olin Library Cornell University Ithaca, NY 14853, Dec. 11, 2017 (Dec. 11, 2017), XP081320179, the whole document.

Rahaf aljundi, Francesca Babiloni, Mohamed Elhoseiny, Marcus Rohrbach, and Tinne Tuytelaars. "Memory aware synapses: Learning what (not) to forget." In Proceedings of the European Conference on Computer Vision (ECCV), pp. 139-154, 2018.

Nicolas Bonnotte. "Unidimensional and evolution methods for optimal transportation." PhD thesis, Paris 11, 2013, pp. 1-168.

Zhiyuan Chen and Bing Liu. "Lifelong machine learning." Synthesis Lectures on Artificial Intelligence and Machine Learning, 10(3): pp. 1-145, 2016.

Ryuichiro Hataya. Ewe pytorch, 2018, An implementation of Elastic Weight Consolidation (EWC), proposed in James Kirkpatrick et al., "Overcoming catastrophic forgetting in neural networks" 2016, PNAS, Mar. 28, 2017, vol. 114, No. 13, pp. 3521-3526, (10.1073/ pnas.1611835114).

David Isele and Akansel Cosgun. "Selective experience replay for lifelong learning." In Thirty-Second AAAI Conference on Artificial Intelligence, 2018, pp. 3302-3309.

James Kirkpatrick, Razvan Pascanu, Neil Rabinowitz, Joel Veness, Guillaume Desjardins, Andrei A Rusu, Kieran Milan, John Quan, Tiago Ramalho, Agnieszka Grabska-Barwinska, et al. Overcoming catastrophic forgetting in neural networks. Proceedings of the national academy of sciences, 114(13): pp. 3521-3526, 2017.

Soheil Kolouri, Gustavo K Rohde, and Heiko Hoffmann. "Sliced wasserstein distance for learning gaussian mixture models," In Proceedings of the IEEE Conference on Computer Vision and Pattern Recognition, pp. 3427-3436, 2018.

Alex Krizhevsky, Ilya Sutskever, and Geoffrey E Hinton. "Imagenet classification with deep convolutional neural networks," In Advances in neural information processing systems, pp. 1097-1105, 2012.

Raphael Lamprecht and Joseph LeDoux. "Structural plasticity and memory." Nature Reviews Neuroscience, 5(1): pp. 45-54, 2004.

Yann LeCun, Bernhard E Boser, John S Denker, Donnie Henderson, Richard E Howard, Wayne E Hubbard, and Lawrence D Jackel. "Handwritten digit recognition with a back-propagation network." In Advances in neural information processing systems, pp. 396-404, 1990.

Leland McInnes, John Healy, and James Melville. "Umap: Uniform manifold approximation and projection for dimension reduction." arXiv preprint arXiv:1802.03426, 2018, pp. 1-51.

Julien Rabin and Gabriel Peyre. "Wasserstein regularization of imaging problem." In 2011 18th IEEE International Conference on Image Processing, pp. 1541-1544. IEEE, 2011.

Anthony Robins. "Catastrophic forgetting, rehearsal and pseudorehearsal." Connection Science, 7(2): pp. 123-146, 1995.

Tom Schaul, John Quan, Ioannis Antonoglou, and David Silver. "Prioritized experience replay." In IJCLR, 2016, p. 1-21.

Hanul Shin, Jung Kwon Lee, Jaehong Kim, and Jiwon Kim. "Continual learning with deep generative replay." In Advances in Neural Information Processing Systems, pp. 2990-2999, 2017.

Akash Srivastava, Lazar Valkov, Chris Russell, Michael U Gutmann, and Charles Sutton. "Veegan: Reducing mode collapse in gans using implicit variational learning." In Advances in Neural Information Processing Systems, pp. 3308-3318, 2017.

Friedemann Zenke, Ben Poole, and Surya Ganguli. "Continual learning through synaptic intelligence." In Proceedings of the 34th International Conference on Machine Learning—vol. 70, pp. 3987-3995. JMLR.org, 2017.

Notification of the International Preliminary Report on Patentability Chapter I for PCT/US2020/033273; dated Jan. 27, 2022.

The International Preliminary Report on Patentability Chapter I for PCT/US2020/033273; dated Jan. 27, 2022.

Kevin Roth, Aurelien Lucchi, Sebastian Nowozin, and Thomas Hofmann. "Stabilizing training of generative adversarial networks through regularization." In Advances in neural information processing systems, pp. 2018-2028, 2017.

Shai Shalev-Shwartz and Shai Ben-David. "Understanding machine learning: From theory to algorithms." Cambridge university press, pp. 24-29, 2014.

* cited by examiner

SYSTEM AND METHOD FOR CONTINUAL LEARNING USING EXPERIENCE REPLAY

CROSS-REFERENCE TO RELATED APPLICATIONS

This application claims the benefit of and is a non-provisional patent application of U.S. Provisional Application No. 62/875,178, filed on Jul. 17, 2019, the entirety of which is hereby incorporated by reference.

GOVERNMENT RIGHTS

This invention was made with government support under U.S. Government Contract Number FA8750-18-C-01038. The government has certain rights in the invention.

BACKGROUND OF INVENTION

(1) Field of Invention

The present invention relates to a learning system and, more specifically, to a system and method for continual learning using experience relay.

(2) Description of Related Art

Learning systems are networks or machines that attempt to learn based on memory of previous experiences. Past works have addressed catastrophic forgetting using two main approaches. The first approach, referred to as model consolidation, was described by Kirkpatrick et al. in Literature Reference No. 6 (see the List of Incorporated Literature References below), while the second approach, referred to as experience replay, was described by Robins in Literature Reference No. 13. Both approaches implement a notion of memory to enable a network to remember the distributions of past learned tasks. The model consolidation approaches are based on separating the information pathways for different tasks in the network such that new experiences do not interfere with previously learned knowledge. Methods that use experience replay, on the other hand, use Complementary Learning Systems (CLS) theory to retain the past tasks' distributions via replaying selected representative samples of past tasks continuously, hence providing a uniform sampling over all tasks for the learning agent enforcing it to perform well on all the tasks.

The model consolidation idea is inspired from the notion of structural plasticity (see Literature Reference No. 9). During learning a task, important weight parameters for that task are identified and are consolidated when future tasks are learned. As a result, the new tasks are learned through free pathways in the network; i.e., the weights that are important to retain knowledge about distributions of past tasks mostly remain unchanged. Several methods exist for identifying important weight parameters. Elastic Weight Consolidation (EWC) models posterior distribution of weights of a given network as a Gaussian distribution which is centered around the weight values from last learned past tasks and a precision matrix, defined as the Fisher information matrix of all network weights. The weights then are consolidated according to their importance, i.e., the value of Fisher coefficient (see Literature Reference No. 6). In contrast to EWC, Zenke et al. described consolidating weights in an online scheme during learning a task (see Literature Reference No. 19). If a network parameter (i.e., a synaptic weight) contributes considerably to changes in the network loss, it is identified as an important weight. More recently, Aljundi et al. used a semi-Hebbian learning procedure to compute the importance of the weight parameters in a both unsupervised and online scheme (see Literature Reference No. 1). The issue with such methods based on structural plasticity is that the network learning capacity is compromised to avoid catastrophic forgetting. As a result, the learning ability of the network decreases as more tasks are learned.

The methods based on complementary learning have investigated how to store a subset of past experiences to reduce dependencies on memory. These samples can be selected in different ways. Schaul et al., for instance, selected samples such that the effect of uncommon samples in the experience was maximized (see Literature Reference No. 15). In other work, Isele and Cosgun explored four potential strategies to select more helpful samples in a buffer for replay (see Literature Reference No. 5). The downside is that storing samples requires memory and becomes more complex as more tasks are learned. To reduce dependence on a memory buffer, Shin et al. developed a more efficient alternative by considering a generative model that can produce pseudo-data points of past tasks to avoid storing real data points (see Literature Reference No. 17). They used generative adversarial structures to learn the task distributions to allow for generating pseudo-data points without storing data. However, adversarial learning is known to require deliberate architecture design and selection of hyper-parameters (see Literature Reference No. 14), and can suffer from mode collapse (see Literature Reference No. 18).

Thus, a continuing need exists for a learning system that improves upon the shortcomings of the prior art. This is accomplished through the system of the present disclosure which matches the distributions of tasks in a middle layer of an autoencoder and learns a shared distribution across the tasks to couple them. The shared distribution is then used to generate samples for experience replay to avoid forgetting. Further details are provided below.

SUMMARY OF INVENTION

The present disclosure provides a system for continual learning using experience replay. In various embodiments, the system includes one or more processors and a memory. The memory is a non-transitory computer-readable medium having executable instructions encoded thereon, such that upon execution of the instructions, the one or more processors perform several operations, including receiving a plurality of tasks sequentially; feeding a current task in the plurality of tasks to an encoder, the current task having data points associated with the current task; mapping, by the encoder, the data points into an embedding space, the embedding space reflecting the data points as discriminative features; generating, by a decoder, pseudo-data points from the discriminative features; providing the pseudo-data points to the encoder: updating the discriminative features in the embedding space based on the pseudo-data points; and updating. by the encoder, a classification of a new task by matching the new task with the discriminative features in the embedding space. Note that the encoder is a parameterized, highly nonlinear function (a neural network), that transforms images to a low dimensional space (range of that function).

In another aspect, the updating by the encoder is performed using a stochastic gradient descent process.

Additionally, in updating the discriminative features in the embedding space, a sliced-Wasserstein distance is used to enforce all tasks to share a same distribution in the embedding space.

In yet another aspect, the system performs operations of identifying an object in a field-of-view of an autonomous vehicle based on the classification of the new task; and causing the autonomous vehicle to perform an operation based on the object identification.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
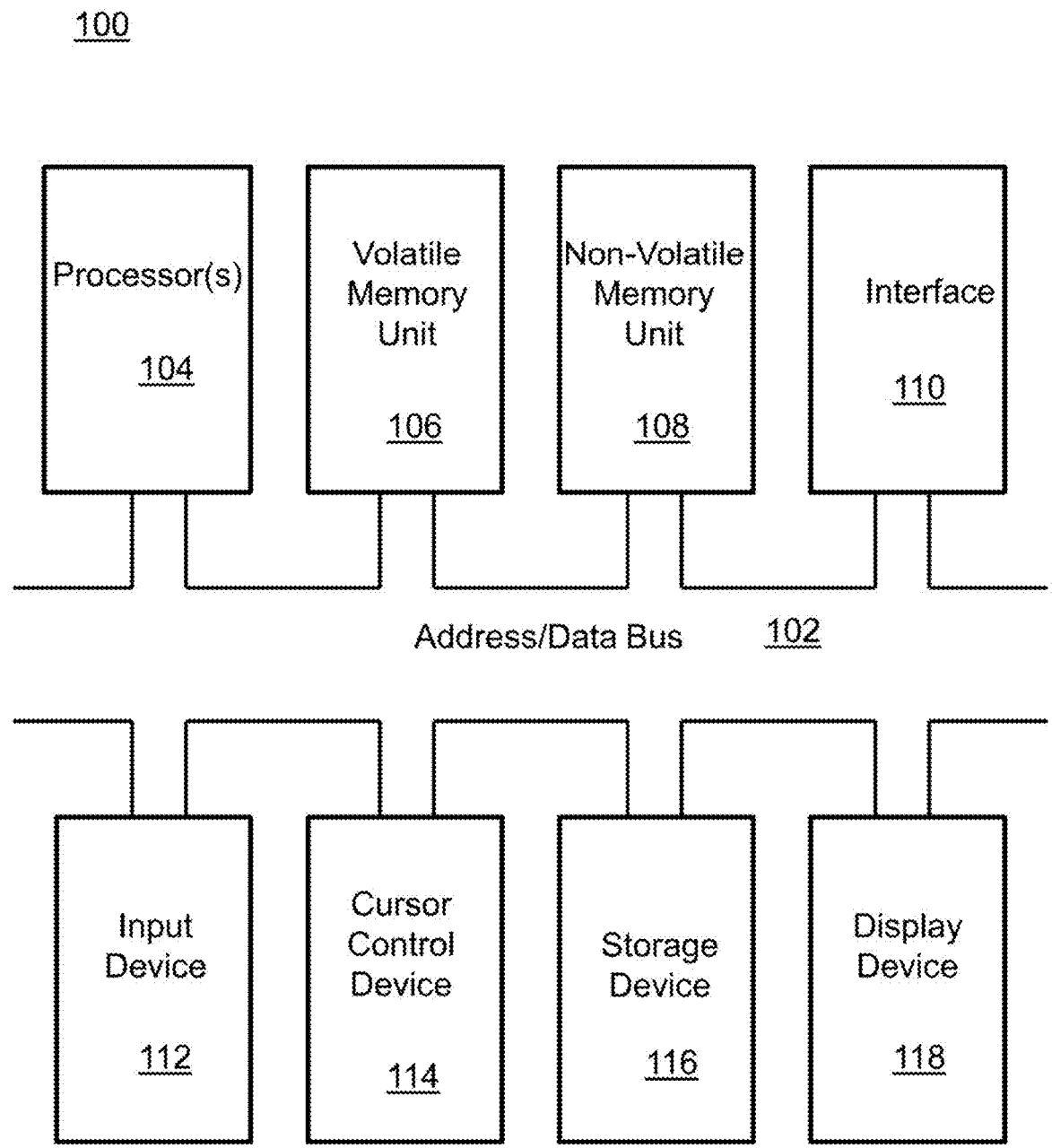
FIG. 1 is a block diagram depicting the components of a system according to various embodiments of the present invention.

The present invention relates to learning system and, more specifically, to a system and method for continual learning using experience relay. The following description is presented to enable one of ordinary skill in the art to make and use the invention and to incorporate it in the context of particular applications.

Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification. (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Rahaf Aljundi, Francesca Babiloni, Mohamed Elhoseiny, Marcus Rohrbach, and Tinne Tuytelaars. Memory aware synapses: Learning what (not) to forget. In Proceedings of the European Conference on Computer Vision (ECCV), pages 139-154, 2018.
2. Nicolas Bonnotte. Unidimensional and evolution methods for optimal transportation. PhD thesis, Paris 11, 2013.
3. Zhiyuan Chen and Bing Liu. Lifelong machine learning. Synthesis Lectures on Artificial Intelligence and Machine Learning, 10(3):1-145, 2016.
4. James Kirkpatrick et al., an implementation of Elastic Weight Consolidation (EWC), proposed in *Overcoming catastrophic forgetting in neural networks* 2016(10.1073/pnas.1611835114).
5. David Isele and Akansel Cosgun. Selective experience replay for lifelong learning. In Thirty-Second AAAI Conference on Artificial Intelligence, 2018.
6. James Kirkpatrick, Razvan Pascanu, Neil Rabinowitz, Joel Veness, Guillaume Desjardins, Andrei A Rusu, Kieran Milan, John Quan, Tiago Ramalho, Agnieszka Grabska-Barwinska, et al. Overcoming catastrophic forgetting in neural networks. Proceedings of the national academy of sciences, 114(13):3521-3526, 2017.

7. Soheil Kolouri, Gustavo K Rohde, and Heiko Hoffmann. Sliced wasserstein distance for learning gaussian mixture models, In Proceedings of the IEEE Conference on Computer Vision and Pattern Recognition, pages 3427-3436, 2018.
8. Alex Krizhevsky, Ilya Sutskever, and Geoffrey E Hinton. Imagenet classification with deep convolutional neural networks, In Advances in neural information processing systems, pages 1097-1105, 2012.
9. Raphael Lamprecht and Joseph LeDoux. Structural plasticity and memory. Nature Reviews Neuroscience, 5(1): 45, 2004.
10. Yann LeCun, Bernhard E Boser, John S Denker, Donnie Henderson, Richard E Howard, Wayne E Hubbard, and Lawrence D Jackel. Handwritten digit recognition with a back-propagation network. In Advances in neural information processing systems, pages 396-404, 1990.
11. Leland McInnes, John Healy, and James Melville. Umap: Uniform manifold approximation and projection for dimension reduction. arXiv preprint arXiv: 1802.03426, 2018.
12. Julien Rabin and Gabriel Peyré. Wasserstein regularization of imaging problem. In 2011 18th IEEE International Conference on Image Processing, pages 1541-1544. IEEE, 2011.
13. Anthony Robins. Catastrophic forgetting, rehearsal and pseudorehearsal. Connection Science, 7(2):123-146, 1995.
14. Kevin Roth, Aurelien Lucchi, Sebastian Nowozin, and Thomas Hofmann. Stabilizing training of generative adversarial networks through regularization. In Advances in neural information processing systems, pages 2018-2028, 2017.
15. Tom Schaul, John Quan, Ioannis Antonoglou, and David Silver. Prioritized experience replay. In IJCLR, 2016.
16. Shai Shalev-Shwartz and Shai Ben-David. Understanding machine learning: From theory to algorithms. Cambridge university press, pages 24-29, 2014.
17. Hanul Shin, Jung Kwon Lee, Jaehong Kim, and Jiwon Kim. Continual learning with deep generative replay. In Advances in Neural Information Processing Systems, pages 2990-2999, 2017.
18. Akash Srivastava, Lazar Valkov, Chris Russell, Michael U Gutmann, and Charles Sutton. Veegan: Reducing mode collapse in gans using implicit variational learning. In Advances in Neural Information Processing Systems, pages 3308-3318, 2017.
19. Friedemann Zenke, Ben Poole, and Surya Ganguli. Continual learning through synaptic intelligence. In Proceedings of the 34th International Conference on Machine Learning-Volume 70, pages 3987-3995. JMLR. org, 2017.

(2) Principal Aspects

Various embodiments of the invention include three "principal" aspects. The first is a system for continual learning (updating) using experience replay. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 12 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
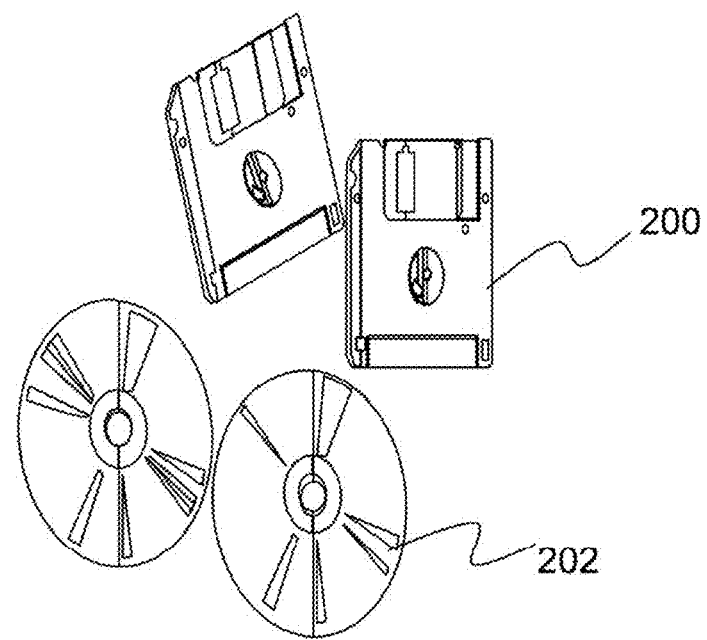
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present disclosure provides a system and method that allows machines to learn without forgetting in a continual learning (updating) setting. Imagine a scenario when the machine should learn a task under various conditions, where the task distribution can change (e.g., an autonomous vehicle driving in different weather conditions and types of roads). Such machine tasks cover a wide spectrum, including object recognition for autonomous systems when sensors are used continually in different environments that can have considerably different probability distributions. In situations like this, the machine should be able to explore and learn the new conditions fast without forgetting what has been learned before for other conditions. The machine retains learned knowledge by accumulating newly learned knowledge to the past knowledge consistently such that no interference occurs over time. To model this learning scenario, consider a sequential learning setting where an agent learns sequential tasks such that the distribution of their input data is subject to change. As a result, the machine needs to adapt its model to learn a new task. Adapting the model unconditionally leads to forgetting past learned tasks. This phenomenon is known as "catastrophic forgetting." In order to prevent forgetting in this continual learning setting, the system employs experience replay, i.e. feeding representative data points from past tasks to the model when learning new tasks to enforce the model to remember past tasks.

Figure 3:
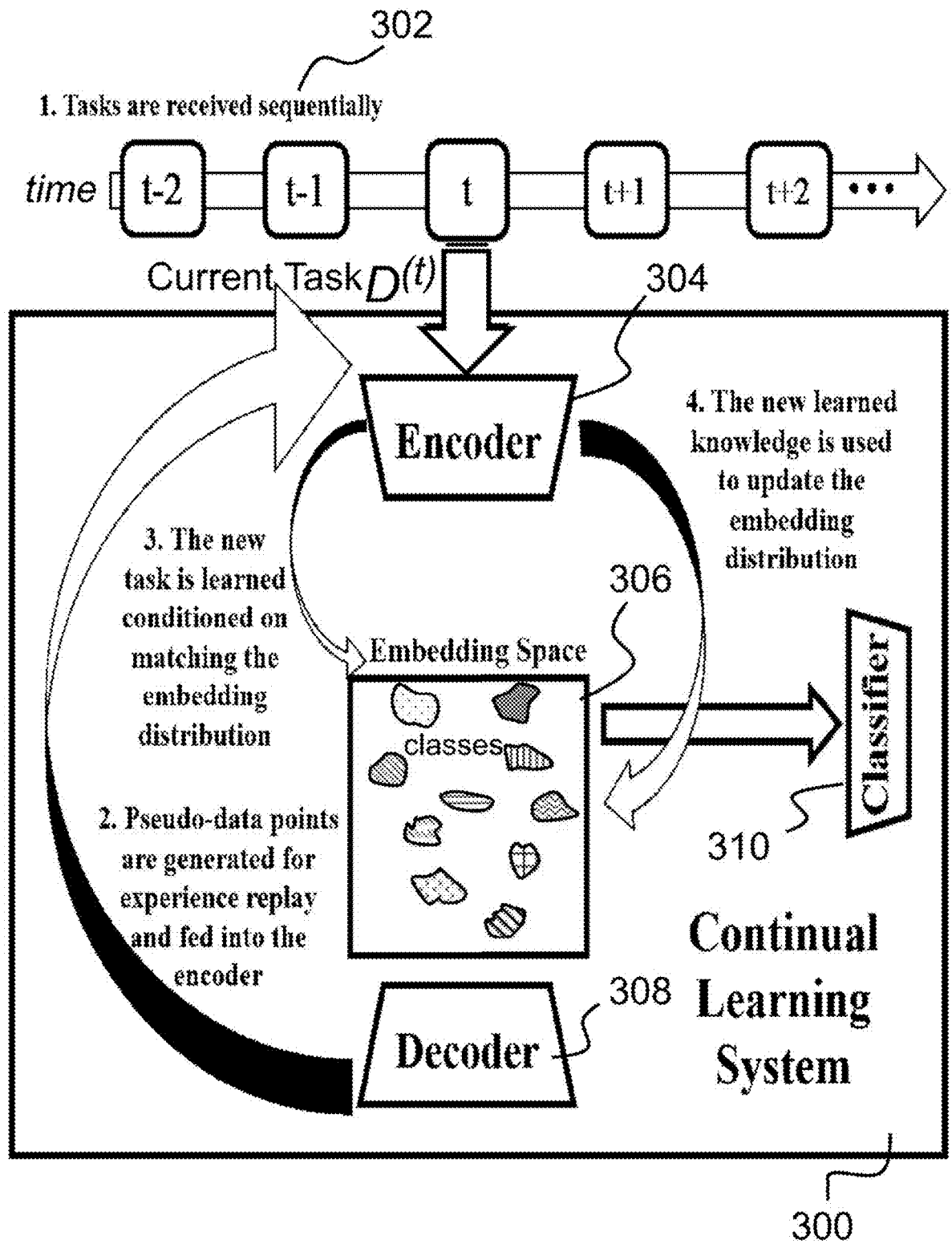
FIG. 3 is a block diagram depicting a system for continual learning according to various embodiments of the present invention.

For further understanding, FIG. 3 presents the system level description of a continual learning system 300 which uses the approach to tackle catastrophic forgetting. In operation, the system receives the task sequentially 302 and feeds the current task to an encoder 304. The encoder 304 maps the data points associated with the task into an embedding space 306, which describes the input in terms of abstract discriminative features (or classes). A decoder 308 generates pseudo-datapoints from the features that are used for experience replay and fed back into the encoder 304. The encoder 304 then learns (updates) a new task conditioned on matching the embedded distribution. The learned new knowledge can then be used to update the embedding distribution in the embedding space 306. Thus, the classifier network receives inputs from the embedding space 306 and then, at the output of the embedding space 306, predicts the label for the given input which has passed through the encoder 304 to the embedding space 306.

To avoid the requirement for a memory buffer to store samples from past tasks, a generative pathway is added to the machine model. As a result, the trained model is able to generate pseudo-samples (via the decoder 308) for the past tasks. To this end, the tasks are coupled by enforcing them to share the same parametric distribution in the task-invariant embedding space 306. This shared distribution can then be used to generate pseudo-samples that can be used for experience replay. The method enables an agent to remember previously learned tasks and easily adapt to learn new tasks without corrupting the knowledge of previously learned task.

The system and method of the present disclosure provide several improvements over the prior a, including the abilities to: 1) enable an autonomous learning agent to adapt to different input task distributions without forgetting previously learned tasks, and 2) accumulate what has been learned from the new task to a shared generative distribution, which is used in learning future tasks in order to avoid forgetting the previously learned task. The method enables the system to be trained on new tasks without forgetting what has been learned before, hence it effectively overcomes catastrophic forgetting in continually learning agents.

The ability for a system to learn continually and adapt to learn new tasks without forgetting past tasks is essential in various applications including, autonomous vehicles and systems, and Intelligence, surveillance and reconnaissance (ISR). A necessary requirement for these systems is to maintain high performance on previously learned tasks while learning new tasks with different distributions. A system capable of satisfying these requirements is of high interest for continual and online learning scenarios. Specific details are provided below.

(4) Specific Details of Various Embodiments

As noted above, the present disclosure is directed to a continual learning system as employed by a learning agent (e.g., autonomous vehicle, etc.). Consider a lifelong learning setting, where the learning agent faces multiple, consecutive tasks in a sequence $t=1, \ldots, T_{MAX}$. The agent learns a new task at each time step and proceeds to learn the next task. Each task is learned based upon the experiences, gained from learning past tasks. Additionally, the agent may encounter the learned tasks in the future and hence must optimize its performance across all tasks, i.e., not to forget learned tasks when future tasks are learned. The agent also does not know a priori, the total number of tasks, which potentially might not be finite, distributions of the tasks, and the order of tasks. Below, we describe a system called Generative Autoencoder for Continual Learning (GACL), which learns multiple tasks sequentially without catastrophic forgetting.

Let at time t, the current task, (t), with training dataset $(X^{(t)}, Y^{(t)})$ arrives. Consider classification tasks where the training data points are drawn independent and identically distributed (i.i.d.) in pairs from the joint probability distribution, i.e., $(x_i^{(t)}, y_i^{(t)}) \sim p^{(t)}(x, y)$ which has the marginal distribution $q^{(t)}$ over x. Assume that the lifelong learning agent trains a deep neural network $f_\theta: \mathbb{R}^d \to \mathbb{R}^k$ with learnable weight parameters θ to map the data points $X^{(t)} = [x_1^{(t)}, \ldots, x_{n_t}^{(t)}] \in \mathbb{R}^{d \times n_t}$ to the corresponding one-hot labels $Y^{(t)} = [y_1^{(t)}, \ldots, y_{n_t}^{(t)}] \in \mathbb{R}^{k \times n_t}$. Learning a single task in isolation is straightforward. The agent can solve for the optimal network weight parameters using standard empirical risk minimization (ERM), $\hat{\theta} = \text{argmin}_\theta \hat{e}_\theta = \text{argmin}_\theta \Sigma_i L_d (f_\theta (x_i^{(t)}), y_i^{(t)})$, where $L_d(\cdot)$ is a proper loss function, e.g., cross entropy. Given a large enough number of data points $n_t$, the model trained on a single task (t) will generalize well on the task test samples as the empirical risk would be a suitable surrogate for the real risk function, $e = \mathbb{E}_{(x,y) \sim p^{(t)}(x,y)} (L_d (f_{\theta^{(t)}} ((x),y))$. See Literature Reference No. 16.

The agent then can advance to learn the next task, but the challenge is that ERM is unable to tackle catastrophic forgetting as the model parameters are learned using solely the current task data which can potentially have very different distribution. Catastrophic forgetting can be considered as the result of considerable deviations of θ(T) from past values over $\{\theta^{(t)}\}_{t=1}^{T-1}$ time as a result of drifts in tasks' distributions $p^{(t)}(x,y)$. As a result, the updated $\theta^{(t)}$ can potentially be highly non-optimal for previous tasks. The concept implemented by the present invention is to prevent catastrophic forgetting through mapping all tasks' data into an embedding space 306, where tasks share a common distribution. This embedding space 306 is represented by the output of a deep network mid-layer, and updating $\theta^{(t)}$ is conditioned to what has been learned before in this embedding. In other words, the deep network is trained such the tasks are coupled in the embedding space through updating $\theta^{(T)}$ conditioned on $\{\theta^{(t)}\}_{t=1}^{T-1}$.

High performance of deep networks stems from learning data-driven and task-dependent high quality features (see Literature Reference No. 8). In other words, a deep net maps data points into a discriminative embedding space 306, captured by network layers, where classification can be performed easily, e.g., classes become separable in the embedding. Following this intuition, the deep net $f_\theta$ is considered to be combined of an encoder $\phi_v(\cdot)$ 304 with learnable parameter v, i.e., early layers of the network, and a classifier network $h_w(\cdot)$ with learnable parameters w, i.e., higher layers of the network. The encoder sub-network $\phi_v$: $X \to Z$ maps the data points into the embedding space $Z \subset \mathbb{R}^f$ 306 which describes the input in terms of abstract discriminative features. Note that after training, as a deterministic function, the encoder 304 network changes the input task data distribution.

The embedding space 306 is discriminative, and therefore it can be modeled as a multi-modal distribution, and, because that distribution is not stationary, the system is susceptible to catastrophic forgetting. Thus, catastrophic forgetting occurs because this distribution is not stationery with respect to different tasks. As such, the system operates based on training encoder $\phi_v$ 304 such that all tasks share a similar distribution in the embedding. i.e., the new tasks are learned such that their distribution in the embedding match the past experience, captured in the shared distribution. Doing so, the embedding space 306 becomes invariant with respect to any learned input task which in turn mitigates catastrophic forgetting.

The key question is how to adapt the standard supervised learning model $f_\theta(\cdot)$ such that the embedding space 306, captured in the deep network, becomes task-invariant. To address this issue, experience replay is used as the main strategy. The base network $f_\theta(\cdot)$ is expanded into a generative model by amending the model with a decoder $\psi_u: Z \to X$, with learnable parameters u. The decoder 308 maps the data representation back to the input space X and effectively makes the pair $(\phi_v, \psi_u)$ an autoencoder. If implemented properly, a discriminative data distribution in the embedding space is learned which can be approximated by a GMM. This distribution captures the knowledge about past learned tasks. When a new task arrives, pseudo-data points for past tasks can be generated by sampling from this distribution and feeding the samples to the decoder 308 network. These pseudo-data points can be used for experience replay in order to tackle catastrophic forgetting. Additionally, the system needs to learn the new task such that its distribution matches the past shared distribution. As a result, future pseudo-data points would represent the current task as well.

Figure 4:
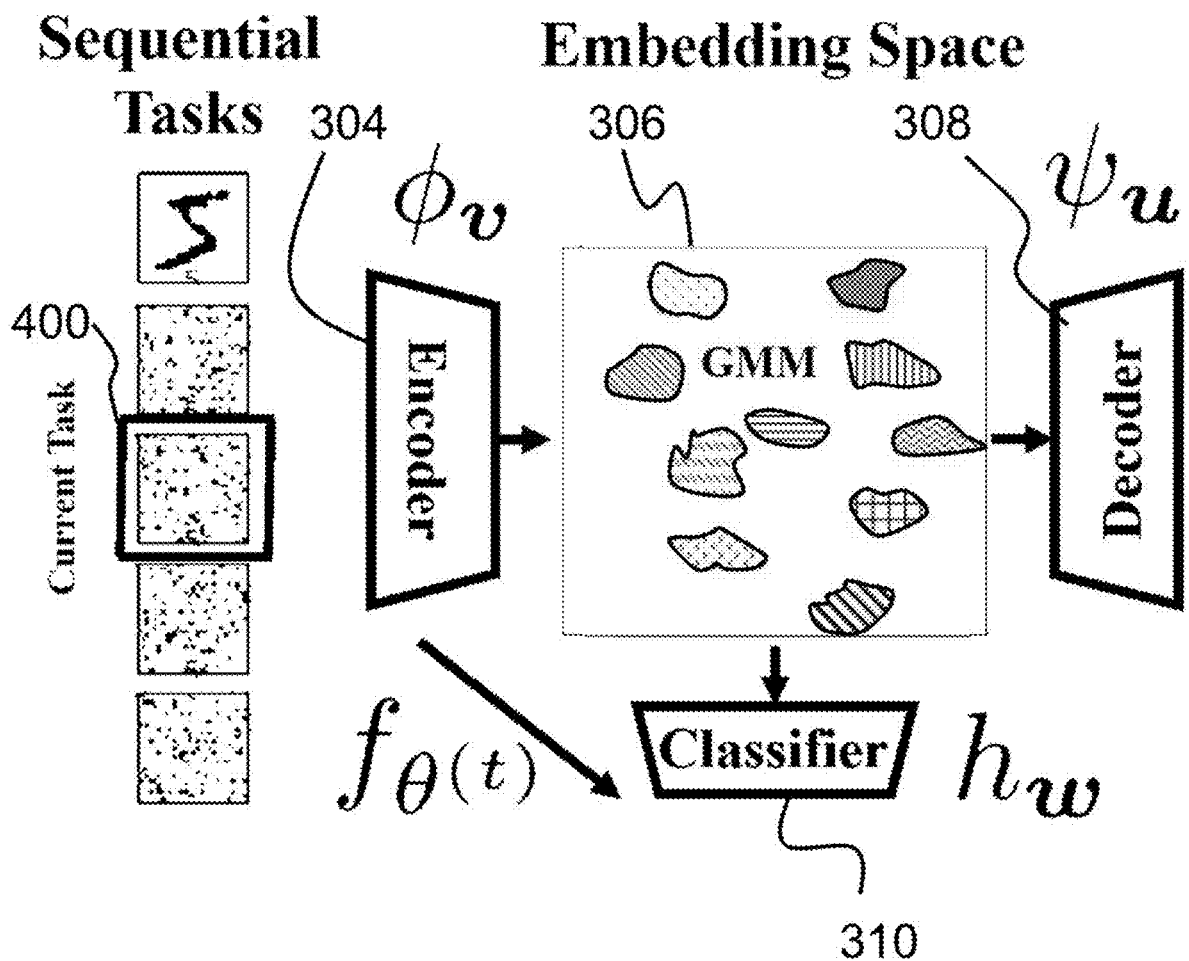
FIG. 4 is an illustration depicting example architecture of the system for continual learning according to various embodiments of the present invention.

FIG. 4 presents a high-level block-diagram visualization of the framework. Following the above framework and with respect to FIG. 4, learning the first task (t=1) 400 reduces to minimizing discrimination loss term for classification and reconstruction loss for the autoencoder to solve for optimal parameters $\hat{v}^{(1)}$, $\widehat{w^{(1)}}$ and $\widehat{u^{(1)}}$, as follows:

$$\min_{v,w,u} \sum_{i=1}^{n_1} \mathcal{L}_d(h_w(\phi_v(x_i^{(1)})), y_i^{(1)}) + \gamma \mathcal{L}_r(\psi_u(\phi_v(x_i^{(1)})), x_i^{(1)}), \quad (1)$$

where $L_r$ is the reconstruction loss and γ is a trade-off parameter between the two loss terms.

Upon learning the first task, as well as subsequent future tasks, a GMM distribution with k components can be fit to the empirical distribution represented by data samples $\{(\phi_v(x_i^{(t)}), y_i^{(t)})_{i=1}^{n_t}\}_{t=1}^T$ in the embedding space 306. The intuition behind this possibility is that as the embedding space 306 is discriminative, data points of each class should form a cluster in the embedding. Let $\hat{p}_J^{(0)}(z)$ denote this parametric distribution. This distribution is updated after learning each task to incorporate what has been learned from the new task. As a result, this distribution captures knowledge about the past. Upon learning this distribution, experience replay is feasible without saving data points. One can generate pseudo-data points in future through random sampling from $\hat{p}_J^{(0)}(z)$ and then passing the samples through the decoder 308 sub-network. It is also crucial to learn the current task 400 such that its corresponding distribution in the embedding matches $\hat{p}_J^{(t-1)}(z)$. Doing so, ensures suitability of GMM to model the empirical distribution. An alternative approach is to use a Variational Auto encoder (VAE), but the discriminator loss helps forming the clusters automatically which in turn makes normal autoencoders a feasible solution.

Let $(X_{ER}^{(T)}, Y_{ER}^{(T)})$ denote the pseudo-dataset, generated at t=T. Following the framework, learning subsequent tasks reduces to solving the following problem:

$$\min_{v,w,u} \sum_{i=1}^{n_t} \mathcal{L}_d(h_w(\phi_v(x_i^{(t)})), y_i^{(t)}) + \gamma \mathcal{L}_r(\psi_u(\phi_v(x_i^{(t)})), x_i^{(t)}) + \qquad (2)$$

$$\sum_{i=1}^{n_{er}} \mathcal{L}_d(h_w(\phi_v(x_{er,i}^{(T)})), y_{er,i}^{(t)}) + \gamma \mathcal{L}_r(\psi_u(\phi_v(x_i^{(t)})), x_i^{(t)}) +$$

$$\lambda \sum_{j=1}^k \phi_v(q^{(t)}(D(X^{(t)}) | C_j), \hat{p}_J^{(t)}(Z_{ER}^{(T)} | C_j)),$$

where $D(\cdot,\cdot)$ is a discrepancy measure, i.e., a metric, between two probability distributions and $\lambda$ is a trade-off parameter. The first four terms in Eq. 2 are empirical classification risk and autoencoder reconstruction loss terms for the current task and the generated pseudo-dataset. The third and fourth terms enforce learning (updating) the current task 400 such that the past learned knowledge is not forgotten. The fifth term is added to enforce the learned embedding distribution for the current task 400 to be similar to what has been learned in the past, i.e., task-invariant. Note that the distance between two distribution on classes was conditioned to avoid class matching challenge, i.e., when wrong classes across two tasks are matched in the embedding, as well as to prevent mode collapse from happening. Class-conditional matching is feasible because there are labels for both distributions. Adding this term guarantees that the system can continually use GMM to fit the shared distribution in the embedding.

The main remaining question is selecting $D(\cdot,\cdot)$ such that it fits the problem. Since the system is computing the distance between empirical distributions, through drawn samples, a metric is needed that can measure distances between distributions using the drawn samples. Additionally, the metric must have non-vanishing gradients as deep learning optimization techniques are gradient-based methods. For these reasons, common distribution distance measures such as KL divergence and JensenShannon divergence are not suitable (see Literature Reference No. 7). Instead, the Wasserstein Distance (WD) metric can be used which has been used extensively in deep learning applications. Since computing WI) is computationally expensive, a Sliced Wasserstein Distance (SWD) is used which approximates WD, but can be computed efficiently (see Literature Reference No. 12).

SWD is computed through slicing a high-dimensional distribution. The d-dimensional distribution is decomposed into one-dimensional marginal distributions by projecting the distribution into one-dimensional spaces that cover the high-dimensional space. For a given distribution p, a one-dimensional slice of the distribution is defined as follows:

$$Rp(t;\gamma) = \int_S p(x)\delta(t - \langle \gamma, x \rangle) dx, \qquad (3)$$

where $\delta(\cdot)$ denotes the Kronecker delta function, $(\cdot,\cdot)$ denotes the vector dot product, $S^{d-1}$ is the d-dimensional unit sphere and $\gamma$ is the projection direction. In other words, $Rp(\cdot;\gamma)$ is a marginal distribution of p obtained from integrating p over the hyperplanes orthogonal to $\gamma$.

SWD approximates the Wasserstein distance between two distributions p and q by integrating the Wasserstein distances between the resulting sliced marginal distributions of the two distributions over all $\gamma$:

$$SW(p,q) = \int_{S^{d-1}} W(Rp(\cdot;\gamma), Rq(\cdot;\gamma)) d\gamma \qquad (4)$$

where $W(\cdot)$ denotes the Wasserstein distance. The main advantage of using SWD is that it can be computed efficiently as the Wasserstein distance between one-dimensional distributions has a closed form solution and is equal to the $l_p$-distance between the inverse of their cumulative distribution functions. On the other hand, the $l_p$-distance between cumulative distribution can be approximated as the $l_p$-distance between the empirical cumulative distributions which makes SWD suitable in the framework. Finally, to approximate the integral in Eq. 4, the system employs a Monte Carlo style integration and approximates the SWD between $f$-dimensional samples $\{\phi_v(wx_i^{(t)}) \in R^f \sim q^{(t)}\}_{j=1}^{n_t}$ and $\{\phi_v(wx_{er,i}^{(t)}) \in R^f \sim \hat{p}_J^{(t)}\}_{j=1}^{n_t}$ in the embedding space as the following sum:

$$SW^2(\phi_v(q^{(t)}), \hat{p}_J^{(t)}) \approx \frac{1}{L} \sum_{l=1}^L \sum_{i=1}^{n_t} |\langle \gamma_l, \phi_v(wx_{t_l[i]}^{(t)}) \rangle - \langle \gamma_l, \phi_v(wx_{t_l[er,i]}^{(t)}) \rangle|^2 \qquad (5)$$

where $\gamma_l \in S^{f-1}$ denote random samples that are drawn from the unit $f$-dimensional ball $S^{f-1}$, and $s_l[i]$ and $t_l[i]$ are the sorted indices of $\{\gamma_l \cdot \phi_v(wx_i)\}_{i=1}^{n_t}$ for the two one-dimensional distributions. The SWD is utilized as the discrepancy measure between the distributions in Eq. (2) to learn each task. Thus, catastrophic forgetting is addressed using the described procedure. The algorithm, Generative Autoencoder for Continual Learning (GACL) is summarized in Algorithm 1 below.

---

Algorithm 1 GACL (L, $\lambda$)

1: Input: data $\mathcal{D}^{(t)} = (X^{(t)}, Y^{(t)})_{t=1}^{T_{Max}}$,
2: Pre-training: learning the first task (t = 1)
3: $\quad \hat{\theta}^{(1)} = (u^{(1)}, v^{(1)}, w^{(1)}) = \arg\min_\theta \Sigma_i \mathcal{L}_d(f_\theta(x_i^{(t)}), y_i^{(t)}) + \gamma \mathcal{L}_r(\psi_u(\phi_v(x_i^{(1)})), x_i^{(1)})$
4: Estimate $\hat{p}_J^{(0)}(\cdot)$ using $\{\phi_v(x_i^{(1)}))\}_{i=1}^{n_t}$
5: for t = 2, ..., $T_{max}$ do
6: $\quad$ Generate pseudo dataset:
7: $\quad \quad \mathcal{D}_{ER} = \{(x_{er,i}^{(t)}, y_{er,i}^{(t)}) \sim \hat{p}_J^{(t-1)}(\cdot)\}$
8: $\quad$ Update learnable parameters using pseudo dataset:) Eq.(2)
9: $\quad$ Estimate: $\hat{p}_J^{(t)}(\cdot)$
10: $\quad$ use $\{\phi_v(x_i^{(t)}), \phi_v(x_{er,i}^{(t)}))\}_{i=1}^{n_t}$ The empirical distribution $\hat{p}_j^{(t)}$ that is generated is used to generate pseudo data points that are similar to data points of the past learned tasks. Note that these pseudo data points are generated without any need for a memory buffer. Upon generation, the pseudo dataset can be used in the process of experience replay that enables the agent not to forget what has been learned when a new task is learned. When the pseudo dataset is generated, it is replayed along with the current task dataset to the classifier 310. As a result, the classifier 310 learns to classify the current task dataset without forgetting how to classify data points from the past learned tasks. Thus, the classifier 310 is trained such that it can continually learn to classify data points from new tasks without forgetting the past tasks. At the same time, no memory buffer is necessary to enable the classifier 310.

(4.1) Reduction to Practice

The system of the present disclosure was implemented and tested on learning two sets of sequential tasks: independent permuted MNIST tasks and related digit classification tasks. MNIST is a database that stands for "Modified National Institute of Standards and Technology." The MNIST database contains handwritten digits (0 through 9), and can provide a baseline for testing image processing systems. For further understanding tests and results are provided below.

(4.1.1) Learning Sequential Independent Tasks

Permuted MNIST tasks were used to validate the framework of the present disclosure. The sequential tasks involve classification of handwritten images of the MNIST (M) dataset (see Literature Reference No. 10), where pixel values for each data point are shuffled randomly by a fixed permutation order for each task. As a result, the tasks are independent and quite different from each other. Since knowledge transfer across tasks is less likely to happen, these tasks are a suitable benchmark to investigate the effect of an algorithm on mitigating catastrophic forgetting as past learned tasks are not similar to the current task. The method was compared against: a) normal back propagation (BP) as a lower bound, b) full experience replay (FR) of data for all the previous tasks as an upper bound, and c) EWC as a competing weight consolidation framework. The same network structure was used for all methods for fair comparison.

Figure 5A:
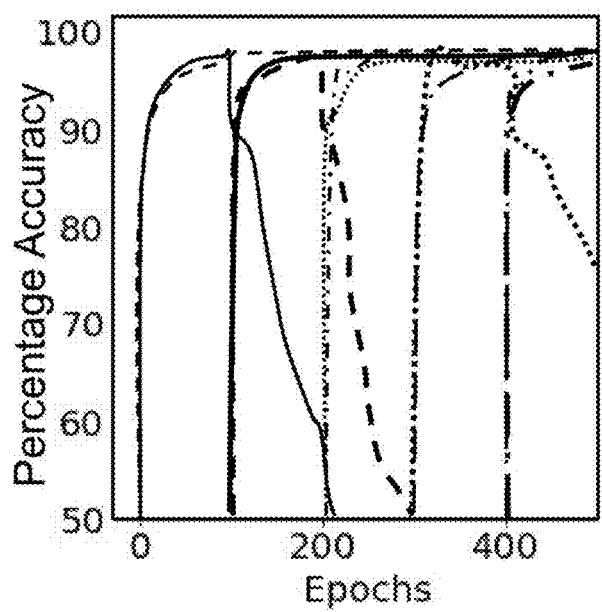
FIG. 5A is a chart depicting performance results for Modified National Institute of Standards and Technology (MNIST) permutation tasks.
Figure 5B:
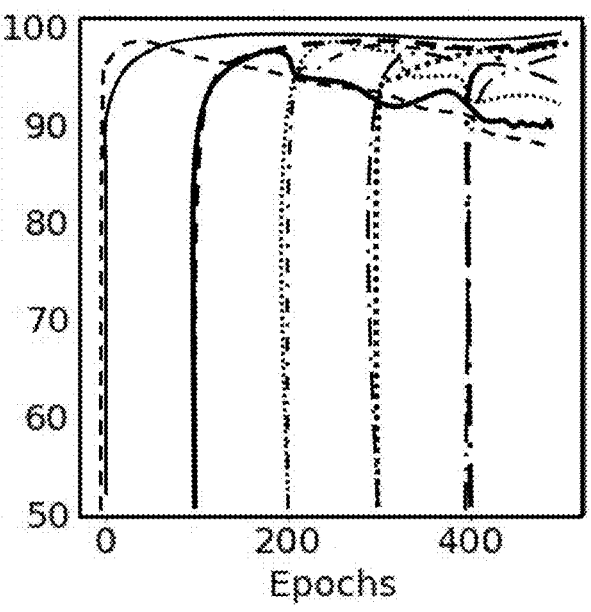
FIG. 5B is a chart depicting performance results for MNIST permutation tasks.

Permuted MNIST was learned using standard stochastic gradient descent and at each iteration, the performance of the network was computed on the testing split of each task data. FIGS. 5A and 5B presents results on five permuted MNIST tasks. FIG. 5A presents learning curves for BP (dotted curves) and EWC (solid curves). An example of a publicly available EWC can be found at Literature Reference No. 4. It is observed that EWC is able to address catastrophic forgetting quite well. But a close inspection reveals that as more tasks are learned, the asymptotic performance on subsequent tasks is less than the single task learning performance (roughly 4% less for the fifth task). This can be understood as a side effect of weight consolidation which limits the learning capacity of the network.

This in an inherent limitation for techniques that regularize network parameters to prevent catastrophic forgetting. FIG. 5B presents learning curves for our method (solid curves) versus FR (dotted curves). As expected, FR prevents catastrophic forgetting perfectly but as was discussed, the downside is memory requirement. The FR result in FIG. 5B demonstrates that the network learning capacity is sufficient for learning these tasks and if there is a perfect generative model, the system could prevent catastrophic forgetting without compromising the network learning capacity. Despite more forgetting in the present approach compared to EWC, the asymptotic performance after learning each task, just before advancing to learn the next task, has improved.

It was also observed that the present algorithm suffers an initial drop in performance of previous tasks, when the system proceeds to learn a new task. Forgetting beyond this initial forgetting is negligible. This can be understood as the existing distance between $\hat{p}_j^{(T-1)}$ and $q(t)$ at $t=T$. These results may suggest that catastrophic forgetting may be tackled better if both weight consolidation and experience replay are combined.

Figure 6A:
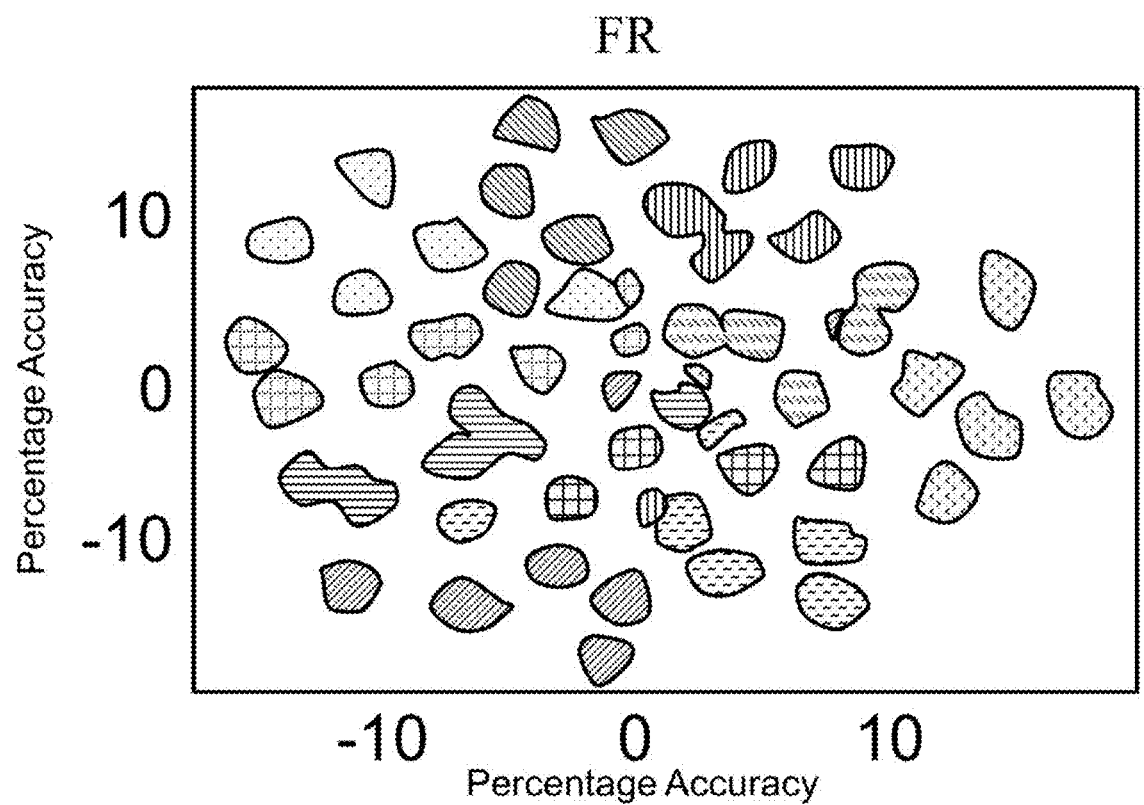
FIG. 6A is a chart depicting uniform manifold approximation and projection (UMAP) visualization of Generative Autoencoder for Continual Learning (GACL) for MNIST permutation tasks.
Figure 6B:
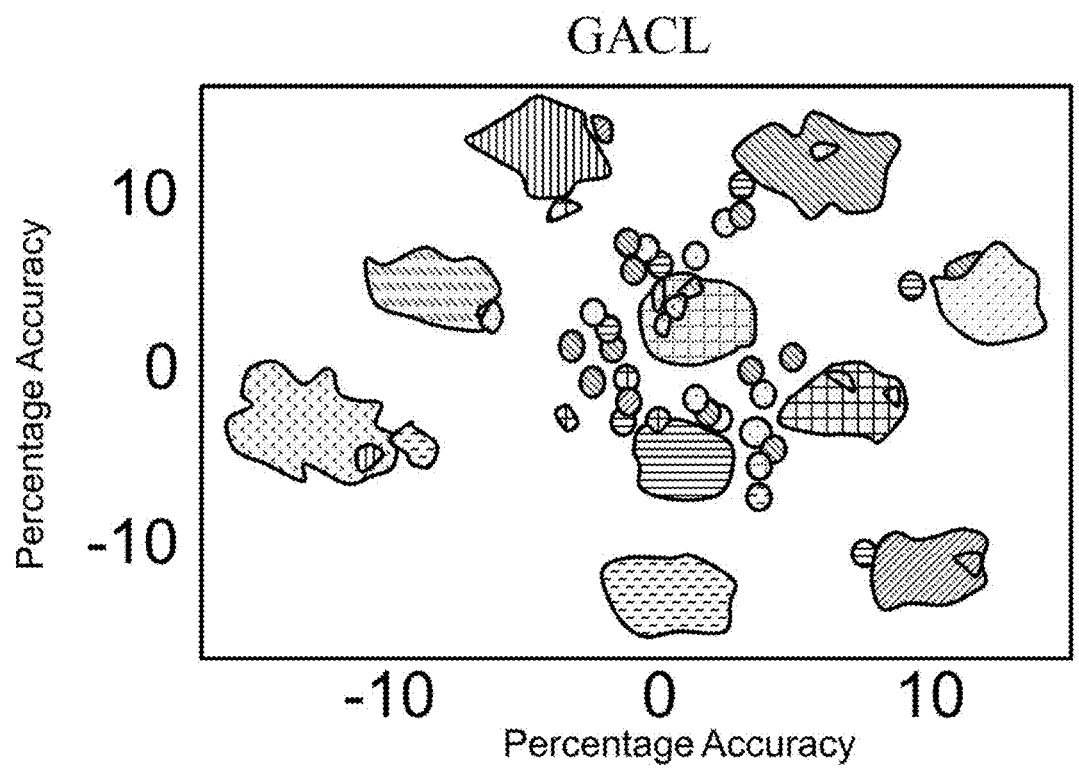
FIG. 6B is a chart depicting UMAP visualization of full experience replay (FR) for MNIST permutation tasks.

To provide a better intuitive understating, FIGS. 6A and 6B provide representations of the testing data for all tasks in the embedding space of the neural network. UMAP (see Literature Reference No. 11) was used to reduce the dimension for visualization purpose. In these figures, each color corresponds to a specific class of digits. It is shown in FIG. 6A that although FR is able to learn all tasks and form distinct clusters for each digit for each task, different clusters are formed for each class in the embedding space. This suggests that FR is unable to learn the concept of the same class across different tasks in the embedding space.

In comparison and as shown in FIG. 6B, GACL is able to match the same class across different tasks, i.e., there are exactly ten clusters for the ten digits. This empirical observation demonstrates that the data distribution can be modeled in the embedding using a multi-modal distribution such as GMM.

(4.1.2) Learning Sequential Tasks in Related Domains

Figure 7A:
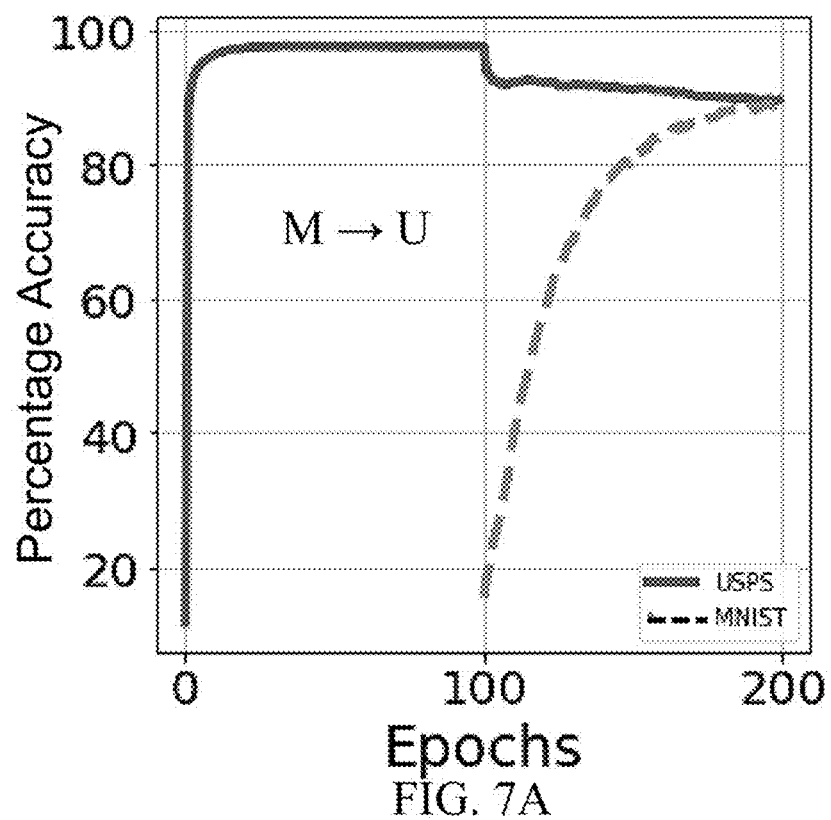
FIG. 7A is a chart depicting performance results on MNIST and United States Postal Service (USPS) digit recognition tasks, going from M→U.
Figure 7B:
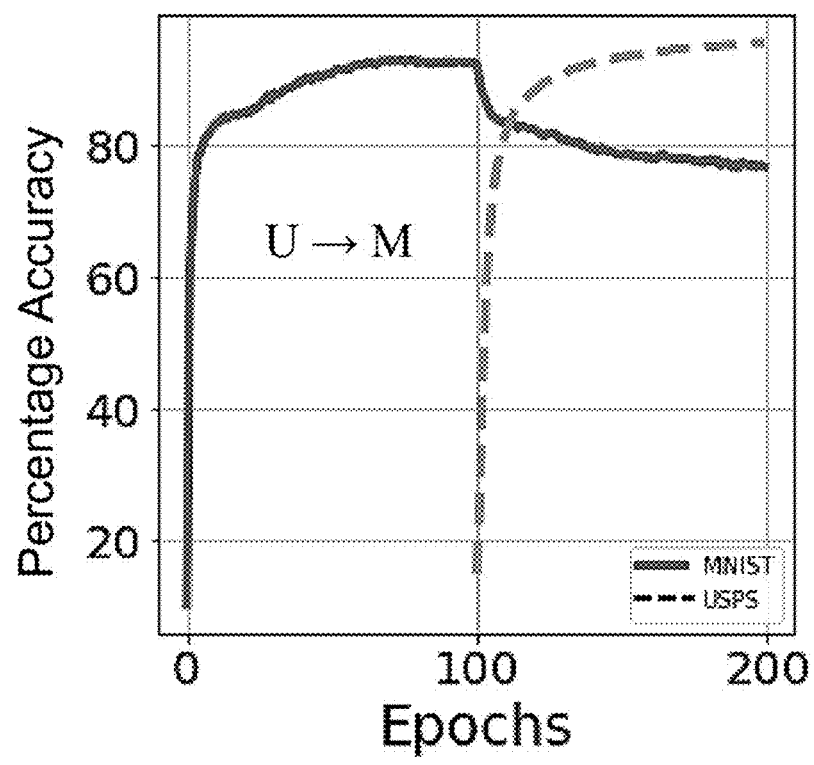
FIG. 7B is a chart depicting performance results on MNIST and the United States Postal Service (USPS) digit recognition tasks, going from U→M.

A second set of experiments was performed on related tasks to investigate the ability of the algorithm, GACL, to learn new domains. Two-digit classification datasets were considered for this purpose: MNIST (M) and USPS (U) datasets. Despite being similar, the USPS dataset is a more challenging task as the number of training set is smaller, 20,000 compared to 60,000 images. To understand this, consider the two possible sequential learning scenarios M→U and U→M. The USPS images were resized to 28×28 pixels to be able to use the same encoder network for both tasks. The experiments can be considered as a special case of domain adaptation as both tasks are digit recognition tasks but in different domains. FIGS. 7A and 7B present learning curves for these two tasks. It was observed that the network retains the knowledge about the first domain, after learning the second domain.

(4.2) Control of a Device

Figure 8:
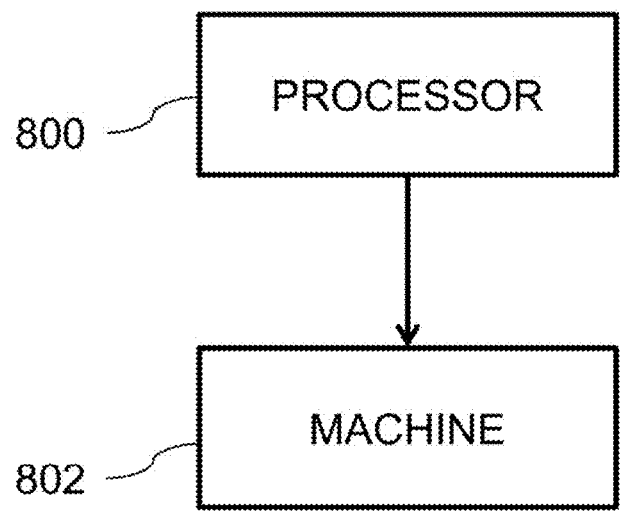
FIG. 8 is a block diagram depicting control of a device according to various embodiments.

As shown in FIG. 8, a processor 800 implementing the system of the present invention may be used to control a machine 802 (e.g., an autonomous vehicle, a machine, a motor, a drone, a camera, etc.). In other words, the invention can be used to improve a broad range of machines 802 that use machine learning in a continual learning (i.e., updating) setting. Some non-limiting examples of practical applications and implementations are provided below.

In one example embodiment, the system can be implemented into an image recognition system. Image recognition systems are used over extended periods of time; thus, since data distribution can change over time, these systems need to continually be updated to incorporate changes in data. The system of the present disclosure can be used to enable image recognition systems to retain what has been learned before and more quickly recognize objects. In doing so, such a system would be able to easily and efficiently classify an object for tracking or other uses. For example, if an object is classified as a target object, the image recognition system can be used to cause a camera to move (via actuators, etc.) to maintain the object within the field of view of the camera. As another example, the platform upon which the image recognition system is mounted (e.g., an autonomous vehicle such as a drone, car, etc.) can be caused to follow or otherwise track the classified target object.

Recognition systems are used in a variety of different domains. For example, autonomous driving vehicles may be trained to work in a specific environment and then used in different environment. This invention can be used to enable these autonomous vehicles to accumulate new learned knowledge consistently to the past learned knowledge and traverse a pathway based on recognizing new objects as the vehicle moves through the environment (such as turning or braking to avoid a pedestrian, etc.).

Other examples include products that need to be personalized. For example, assistant robots which are becoming popular are usually trained for a broad user; however, upon being used in a specific environment, they need to learn to address personalized requirements for each user. This invention can help such products to continually learn and update their performance. For example, a helpful ability for a personal assistant robot is face recognition. Since a robot may encounter new people, it needs to learn to recognize new faces without forgetting the past people.

As yet another example, the system can be integrated with machines that continually encounter unexplored environments. For example, rescue robots should perform well in unexplored environment and adapt to learn how to act based their prior knowledge to learn the new task fast and also add the new learned knowledge to their repository of knowledge. In this situation, the rescue robot can move or otherwise perform the new task based on the prior and learned knowledge. For example, a rescue robot maybe trained on simulated environments but in practice when it is operated in the real world, it needs to expand its learned knowledge to the real-)world environment.

Another example can be any learning systems that has limited memory and should process a stream of data continually and upon processing the current data, move to processes the next batch of data. Such systems may need to remember what has been learned about the past data and accumulatively learn the new data. This invention enables such systems to continually learn without any need to expand memory. Unmanned drones over extended period missions are examples of such systems.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for continual learning using experience replay, the system comprising:
   one or more processors and a memory, the memory being a non-transitory computer-readable medium having executable instructions encoded thereon, such that upon execution of the instructions, the one or more processors perform operations of:
   receiving a plurality of tasks sequentially, the plurality of tasks having at least a current task with associated data points;
   mapping the data points into an embedding space, the embedding space reflecting the data points as discriminative features;
   generating pseudo-data points from the discriminative features;
   updating the discriminative features in the embedding space based on the pseudo-data points; and
   updating a classification of a new task by matching the new task with the discriminative features in the embedding space.

2. The system as set forth in claim 1, wherein updating the classification of the new task is performed using a stochastic gradient descent process.

3. The system as set forth in claim 2, wherein in updating the discriminative features in the embedding space, a sliced-Wasserstein distance is used to enforce all tasks to share a same distribution in the embedding space.

4. The system as set forth in claim 3, further comprising operations of:
   identifying an object in a field-of-view of an autonomous vehicle based on the classification of the new task; and
   causing the autonomous vehicle to perform an operation based on the object identification.

5. The system as set forth in claim 1, wherein in updating the discriminative features in the embedding space, a sliced-Wasserstein distance is used to enforce all tasks to share a same distribution in the embedding space.

6. The system as set forth in claim 1, further comprising operations of:
   identifying an object in a field-of-view of an autonomous vehicle based on the classification of the new task; and
   causing the autonomous vehicle to perform an operation based on the object identification.

7. A computer program product for continual learning using experience replay, the computer program product comprising:
   a non-transitory computer-readable medium having executable instructions encoded thereon, such that upon execution of the instructions by one or more processors, the one or more processors perform operations of:
   receiving a plurality of tasks sequentially, the plurality of tasks having at least a current task with associated data points;
   mapping the data points into an embedding space, the embedding space reflecting the data points as discriminative features;
   generating pseudo-data points from the discriminative features;
   updating the discriminative features in the embedding space based on the pseudo-data points; and
   updating a classification of a new task by matching the new task with the discriminative features in the embedding space.

8. The computer program product as set forth in claim 7, wherein updating the classification of the new task is performed using a stochastic gradient descent process.

9. The computer program product as set forth in claim 8, wherein in updating the discriminative features in the embedding space, a sliced-Wasserstein distance is used to enforce all tasks to share a same distribution in the embedding space.

10. The computer program product as set forth in claim 9, further comprising operations of:

identifying an object in a field-of-view of an autonomous vehicle based on the classification of the new task; and
causing the autonomous vehicle to perform an operation based on the object identification.

11. The computer program product as set forth in claim 7, wherein in updating the discriminative features in the embedding space, a sliced-Wasserstein distance is used to enforce all tasks to share a same distribution in the embedding space.

12. The computer program product as set forth in claim 7, further comprising operations of:
identifying an object in a field-of-view of an autonomous vehicle based on the classification of the new task; and
causing the autonomous vehicle to perform an operation based on the object identification.

13. A computer implemented method for continual learning using experience replay, the method comprising an act of:
causing one or more processors to execute instructions encoded on a non-transitory computer-readable medium, such that upon execution, the one or more processors perform operations of:
receiving a plurality of tasks sequentially, the plurality of tasks having at least a current task with associated data points;
mapping the data points into an embedding space, the embedding space reflecting the data points as discriminative features;
generating pseudo-data points from the discriminative features;
updating the discriminative features in the embedding space based on the pseudo-data points; and
updating a classification of a new task by matching the new task with the discriminative features in the embedding space.

14. The method as set forth in claim 13, wherein updating the classification of the new task is performed using a stochastic gradient descent process.

15. The method as set forth in claim 14, wherein in updating the discriminative features in the embedding space, a sliced-Wasserstein distance is used to enforce all tasks to share a same distribution in the embedding space.

16. The method as set forth in claim 15, further comprising acts of:
identifying an object in a field-of-view of an autonomous vehicle based on the classification of the new task; and
causing the autonomous vehicle to perform an operation based on the object identification.

17. The method as set forth in claim 13, wherein in updating the discriminative features in the embedding space, a sliced-Wasserstein distance is used to enforce all tasks to share a same distribution in the embedding space.

18. The method as set forth in claim 13, further comprising acts of:
identifying an object in a field-of-view of an autonomous vehicle based on the classification of the new task; and
causing the autonomous vehicle to perform an operation based on the object identification.

* * * * *